2 Sheets—Sheet 1

P. F. HODGES.
HARVESTER-RAKE.

No. 175,705. Patented April 4, 1876.

Witnesses.
A. Ruppert
John Eils

P. F. Hodges
Inventor.
D. P. Holloway & Co
Attys

P. F. HODGES.
HARVESTER-RAKE.
No. 175,705.  Patented April 4, 1876.
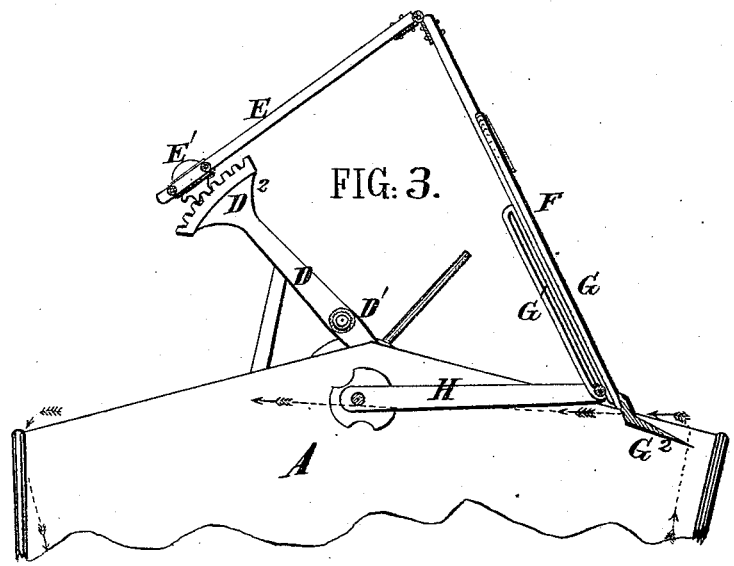
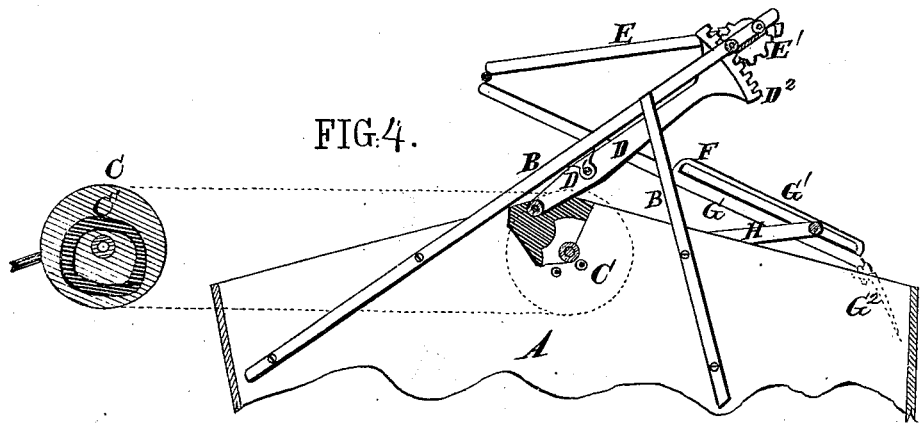
Witnesses.
A. Ruppert,
John Eils
P. F. Hodges
Inventor.
D. P. Holloway & Co
Attys

UNITED STATES PATENT OFFICE.

PLINY F. HODGES, OF MASSILLON, ASSIGNOR OF ONE-HALF HIS RIGHT TO HOOVER & CO., OF MIAMISBURG, OHIO.

IMPROVEMENT IN HARVESTER-RAKES.

Specification forming part of Letters Patent No. 175,705, dated April 4, 1876; application filed November 16, 1875.

*To all whom it may concern:*

Be it known that I, PLINY F. HODGES, of Massillon, in the county of Stark and State of Ohio, have invented a new and useful Improvement in Harvester-Rakes, of which the following is a specification:

This invention relates to that class of rakes commonly known as "table-rakes," in which a square or rectangular platform is swept by an arm turning on an axis at right angles to the plane of the platform.

Figure 1:
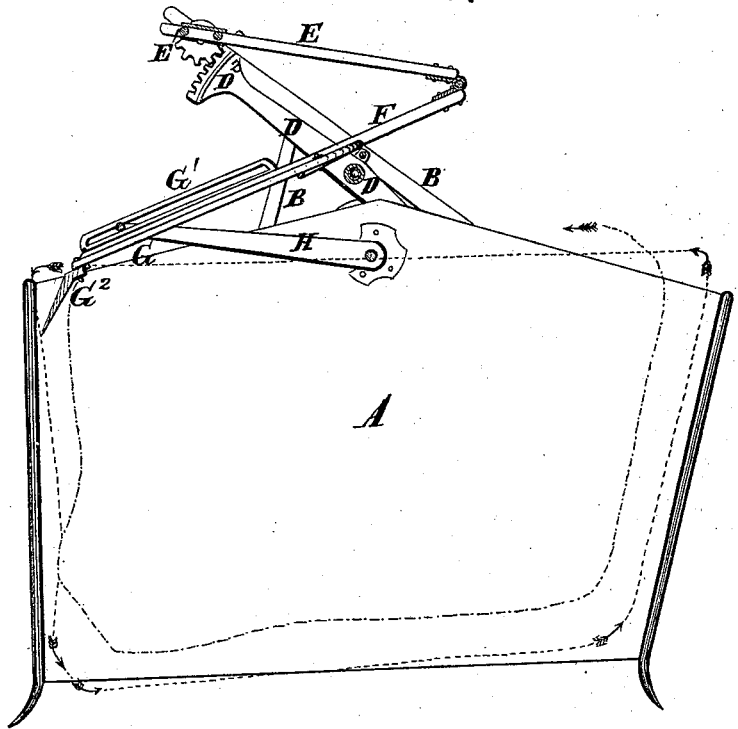
Figure 2:
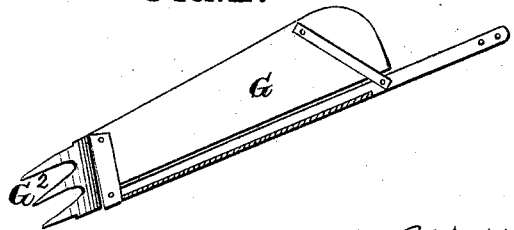

In the annexed drawings, Figure 1 is a plan view, showing the position of the parts as the point of the rake is entering the field of the platform. Fig. 2 is an elevation of the rake. Fig. 3 is a plan view, showing the position of the parts as the point of the rake is leaving the field of the platform. Fig. 4 is a bottom view of the rake, as shown in Fig. 3, and a detached section of the cam-plate.

The same letters are employed in all the figures in the indication of the same parts.

A is the platform, to which the braces B are fastened, projecting in rear to support the rake mechanism. C is a plate below the bottom of the platform, having on its upper face a double-walled cam, C', to give an oscillation to the rack-bar D, which swings on a pivot, at $D^1$, fastened to the brace B, and which has a segmental rack, $D^2$, on its other end. This rack engages the teeth of the segment E' on the end of the arm E, pivoted to the end of the brace at the center of the segment, so that as the arm $D^1$ oscillates a corresponding oscillation is given to the arm E. On the outer end of the latter is pivoted the arm F, which carries the rake, consisting of a vertical board, G, and the pointed teeth $G^2$, and slotted plate $G^1$, which extends under the bar F, and receives the friction-roller on the end of the crank-arm H, which is attached to the upper end of the shaft of the cam-wheel C.

The operation of the rake is as follows: The parts being in the position shown in Fig. 1, the movement of the segments $D^2$ E' will rotate the arm E to the extremest point of its oscillation, and push forward the points $G^2$ of the rake to the front corner of the platform. The stud on crank H being drawn to the rear end of the slot, then (the rack-bar remaining nearly stationary) the crank will swing the teeth along the platform in rear of the guards, and sweep the gavel to the outer side of the platform, when the reverse movement of segment $D^2$ will draw back the rake, and with it the gavel, until the latter falls off behind the platform, the stud on the crank H being drawn to the front end of the slot, and then the movement of the crank will swing the rake to its first position, the rack-bar being again nearly stationary, with only movement enough to allow the rake to make its required movement.

What I claim as my invention, and desire to secure by Letters Patent, is—

1. The combination of the oscillating rack-bar D, arm E, and segment E', arm F, slot $G^1$, and crank H, for sweeping the rake over the platform, substantially as set forth.

2. In combination with an arm, E, pivoted to the end of the rake-arm F, and oscillating rack-bar D, to project and retract it, the crank H, having stud on its outer end engaged with a slot in the rake-arm, to give it transverse movement across the platform, while it allows the other movement, substantially as set forth.

In testimony whereof I have signed my name to this specification in the presence of two subscribing witnesses.

PLINY F. HODGES.

Witnesses:
D. P. HOLLOWAY,
B. EDW. J. EILS.